United States Patent [19]
Hayashi et al.

[11] Patent Number: 6,037,435
[45] Date of Patent: Mar. 14, 2000

[54] UNDERWATER CURABLE COATING COMPOSITION

[75] Inventors: Toshiharu Hayashi; Toshimoto Tsuji, both of Yokohama, Japan

[73] Assignee: Dai Nippon Toryo Co., Ltd., Osaka, Japan

[21] Appl. No.: 09/160,326

[22] Filed: Sep. 25, 1998

Related U.S. Application Data

[63] Continuation-in-part of application No. 08/814,639, Mar. 10, 1997.

[30] Foreign Application Priority Data

Mar. 21, 1996 [JP] Japan ..................................... 8-064487
Jan. 22, 1997 [JP] Japan ..................................... 9-009567

[51] Int. Cl.$^7$ ................................................. C08G 59/02
[52] U.S. Cl. .......................... 528/103; 523/177; 523/404; 523/414; 528/119
[58] Field of Search ..................................... 523/177, 404, 523/414; 528/109, 111, 111.3, 112, 115, 103, 119

[56] References Cited

U.S. PATENT DOCUMENTS 4,391,958  7/1983  Minato et al. .......................... 525/504
4,428,989  1/1984  Marshall .................................. 428/35

*Primary Examiner*—Robert Dawson
*Assistant Examiner*—D. Aylwood
*Attorney, Agent, or Firm*—Oblon, Spivak, McClelland, Maier & Neustadt, P.C.

[57] ABSTRACT

The present application to an underwater curable coating composition which is used for protecting or imparting an aesthetic appearance to various structures. An underwater curable coating composition consisting essentially of an epoxy resin component and its curing agent, wherein the epoxy resin component is a mixture comprising a liquid hydrophobic epoxy resin and a self-emulsifiable liquid epoxy resin. The curing agent is composed partly or solely of a ketimine.

10 Claims, No Drawings

UNDERWATER CURABLE COATING COMPOSITION

This application is a Continuation-in-part (CIP) of application Ser. No. 08/814,639, filed on Mar. 10, 1997.

The present invention relates to an underwater curable coating composition which is used for protecting or imparting an aesthetic appearance to various structures, particularly concrete structures, which are located in water or which are in a wet condition.

Heretofore, corrosion proofing paints represented by epoxy resin type paints, have been coated on various steel structures such as stakes, bridge piers, dum gates or water gates, which are constructed at sea shores, seas, rivers, lakes or the like and which are located in water or which are in a wet condition, for their protection or for imparting an aesthetic appearance to them. For example, JP-A-1-129054, JP-A-1-129070, JP-A-2-255879, JP-A-2-29479 and JP-A-4-320827 disclose underwater curable epoxy resin type coating materials.

On the other hand, the concrete structure in water or in a wet condition is porous at its surface and contains water at its interior, whereby even if a conventional corrosion proofing paint for a steel structure is coated thereon, its adhesion is very poor. For this reason, it has been rare to apply a paint to a concrete structure.

However, in recent years, durability for a long period of time and an aesthetic appearance have been required also for a concrete structure like for a steel structure, and it has been strongly desired to develop a coating material which shows good adhesion to a concrete structure in water or in a wet condition.

Accordingly, it is an object of the present invention to provide an underwater curable coating composition suitable for a structure, particularly a concrete structure, in water or in a wet condition.

To accomplish the above object, the present inventors have conducted various researches on coating materials which can be coated to a concrete structure in water or in a wet condition and as a result, they have found that by a combination of a specific epoxy resin mixture and a curing agent, a coating film excellent in the adhesion to such a concrete structure, can be formed. The present invention has been accomplished on the basis of this discovery.

That is, the present invention provides an underwater curable coating composition of a non-solvent type which comprises a binder consisting essentially of an epoxy resin component and its curing agent, wherein the epoxy resin component is an epoxy resin mixture comprising a hydrophobic epoxy resin which is liquid at room temperature and a self-emulsifiable epoxy resin which is liquid at room temperature, and the curing agent is composed partly or solely of a ketimine compound.

Now, the present invention will be described in detail with reference to the preferred embodiments.

The epoxy resin component constituting the binder to be used in the present invention is an epoxy resin mixture comprising a hydrophobic epoxy resin which is liquid at room temperature and a self-emulsifiable epoxy resin which is liquid at room temperature.

The hydrophobic epoxy resin is a resin having an epoxy equivalent of from about 150 to 250, preferably from 160 to 230 and having no hydrophilic group, which can be obtained by subjecting a bisphenol such as bisphenol A or bisphenol F, and epichlorohydrin, to a condensation reaction in accordance with a conventional method.

Typical commercial products of such a hydrophobic epoxy resin include bisphenol A type epoxy resins such as Adecaresin EP-4400, Adecaresin EP-4520S (tradenames, manufactured by Asahi Denka Kogyo K.K.), Epicoat 828 (tradename, manufactured by Yuka Shellepoxy K.K.), Epichron 840 (tradename, manufactured by Dainippon Ink & Chemicals, Inc.) and Epototo YD-128 (tradename, manufactured by Toto Kasei K.K.), and bisphenol F type epoxy resins, such as Adecaresin EP-4950 (tradename, Asahi Denka Kogyo K.K.), Araldite XPY-306 (tradename, manufactured by Ciba Geigy AG), Epicoat 806 (tradename, manufactured by Yuka Shellepoxy K.K.), Epichron 830 (tradename, manufactured by Dainippon Ink & Chemicals, Inc.) and Epototo YDF-170 (tradename, manufactured by Toto Kasei K.K.).

On the other hand, the self-emulsifiable epoxy resin is a resin having an epoxy equivalent of from about 150 to 300, preferably from 160 to 250, which has been made hydrophilic by introduction of hydrophilic groups such as carboxyl groups (—COOH), amino groups (—NH$_2$), hydroxyl groups (—OH), carbonyl groups (>CO) or sulfonic groups (—SO$_3$H) to a backbone of an epoxy resin and which is self-emulsifiable even without using a surfactant.

Such a self-emulsifiable epoxy resin can be prepared, for example, by a method as disclosed in JP-A-7-206982, in which a carboxyl group-containing compound (A) obtainable by reacting a polyoxyethylenepolyol compound with an acid anhydride compound in such a proportion that the equivalent ratio of acid anhydride groups/hydroxyl groups would be from 1.0 to 1.1, and an epoxy resin (B) having at least two epoxy groups in its molecule, are reacted in such a ratio that the epoxy resin (B) would be from 2.0 to 3.5 mol per equivalent of carboxyl groups of the carboxyl group-containing compound (A); a method as disclosed in JP-A-7-304853 wherein a carboxyl group-containing compound (A) obtainable by reacting a phosphorus-containing polyoxyalkylenepolyol compound and an acid anhydride compound in such a ratio that the equivalent ratio of acid anhydride groups/hydroxyl groups would be from 1.0 to 1.1, and an epoxy resin (B) having at least two epoxy groups in its molecule, are reacted in such a ratio that the epoxy resin (B) would be from 2.0 to 3.5 mol per equivalent of carboxyl groups of the carboxyl group-containing compound (A); a method as disclosed in JP-A-6-228272 in which a urethane bond-containing compound (A) obtainable by reacting a polyalkylenepolyetherpolyol compound with an excessive polyisocyanate compound, an epoxy compound (B) containing at least 0.1 hydroxyl group and an adjacent epoxy group in its molecule, and an alkylphenol ethoxylate (C) are reacted in such a ratio that (A)/(B)/(C)=1.0/1.0 to 10.0/0.1 to 2.0 (in molar ratio) (provided that the equivalent ratio of the total of hydroxyl groups of (B) and (C) to the isocyanate groups of (A) is at least 1.0); or a method as disclosed in JP-A-2-38443.

Typical commercial products of such a self-emulsifiable epoxy resin include, for example, Adecaresin EPES-0425 (tradename, manufactured by Asahi Denka Kogyo K.K.), Adecaresin EPES-0427 (tradename, manufactured by Asahi Denka Kogyo K.K.), and ACR epoxy R1465 (tradename, manufactured by ACR Company).

The self-emulsifiable epoxy resin used in the present invention is a hydrophilic epoxy resin having a hydrophilic group such as a carboxyl group, an amino group, a hydroxyl group, a carbonyl group, a sulfone group or the like introduced into an epoxy resin, which is an epoxy resin stably dispersible in water in an emulsion state for at least one day (20° C.) without using a surfactant when it is mixed with water.

By using a mixture comprising the above described hydrophobic epoxy resin which is liquid at room temperature and the self-emulsifiable epoxy resin which is liquid at room temperature, as the epoxy resin component for the present invention, it is possible to carry out the coating operation efficiently and to form a tough coating film which is excellent in adhesion.

The mixing ratio by weight of the hydrophobic epoxy resin to the self-emulsifiable epoxy resin is usually from 100:20 to 100:200, preferably from 100:25 to 100:150. If the hydrophobic epoxy resin exceeds the above range, the coating material tends to hardly adhere to the surface of a concrete structure containing a large amount of water, and the coating material tends to be separated and hardly coated. On the other hand, if it is less than the above range, the coating film tends to absorb a substantial amount of water, whereby the adhesion tends to be poor, and the intended tough coating film tends to be hardly obtainable.

In the present invention, the curing agent constituting the binder contains a ketimine compound as an essential component. The ketimine compound is used as a part or whole of the curing agent. The amine value of the ketimine compound may, for example, be from 600 to 1000, preferably from 700 to 900.

The ketimine compound is a compound which can be obtained by reacting a primary or secondary amino group-containing compound such as diethylenetriamine, triethylenetetramine, propylenediamine or m-xylylenediamine, with a carbonyl compound such as acetone, methyl ethyl ketone or isobutyl methyl ketone. Such a ketimine compound will decompose into an amine compound and a carbonyl compound upon reaction with water. Accordingly, by its reaction with water contained or penetrated into the coating film, it provides a dehydrating function as well as a function as a curing agent for the epoxy resin, whereby it is very useful as a curing agent of the coating material of the present invention which is applied to an object to be coated which is in water or in a wet condition.

As mentioned above, the ketimine compound may be used alone as the curing agent. However, it is preferred to use it in combination with a polyamine compound, a modified aliphatic polyamine compound, a modified aromatic polyamine compound, a modified alicyclic polyamine compound, a polyamide compound or an amine adduct compound as a conventional curing agent for an epoxy resin, in order to accelerate the curing of the coating film. The amine value of such a polyamine compound may, for example, be from 200 to 500, preferably from 230 to 400.

The ketimine compound is used in an amount of at least 25 wt %, preferably from 30 to 60 wt %, in the total curing agent.

The binder comprises the above described epoxy resins and curing agent, and the blend ratio of the two is preferably such that active hydrogen contained in the curing agent would be from 0.7 to 1.5 equivalents, preferably from 1.1 to 1.4 equivalents, per equivalent of epoxy groups contained in the epoxy resin.

To the coating composition of the present invention, various additives, for example, a filler pigment such as talc, barium sulfates calcium carbonate, silica, mica or glass flakes, a coloring pigment such as titanium oxide, iron oxide red or carbon black, a rust-preventing pigment such as zinc chromate, zinc phosphate or zinc molybdate, glass fiber, micaceous iron oxide or aggregate such as silica sand, a modifying resin such as a low molecular weight cumarone resin or a xylene resin, a dehydrating agent such as gypsum, silica gel, alumina sol, alkoxysilane or alkoxy titanium, and other additives such as a silane coupling agent, a dispersant, a defoaming agent, and a flow-controling agent, may further be incorporated, as the case requires.

The total amount of such various pigments and aggregate is usually at most 60 wt %, preferably from 30 to 55 wt %, in the coating material.

The coating composition of the present invention comprises the above described constituting components. The epoxy resins as the base components and the curing agent are mixed to form a coating material immediately prior to the coating operation and then coated by a coating means such as a knife, a trowel, a roller or a brush on various objects to be coated such as steel structures or concrete structures in water or in a wet condition. The coating amount may optionally be selected, but is usually from 300 to 1000 g/m$^2$.

Now, the present invention will be described in further detail with reference to Examples. However, it should be understood that the present invention is by no means restricted to such specific Examples. In the Examples, "parts" means "parts by weight".

| Base components | |
|---|---|
| Hydrophobic bisphenol A type liquid epoxy resin *1) | 100 parts |
| Self-emulsifiable liquid epoxy resin *2) | 150 parts |
| Precipitated barium sulfate | 250 parts |
| Titanium oxide | 50 parts |
| Curing agent components | |
| Ketimine compound *3) | 100 parts |
| Modified aliphatic polyamine *4) | 100 parts |
| Precipitated barium sulfate | 200 parts |
| Carbon black | 2 parts |

*1) "Adecaresin EP-4400", tradename, manufactured by Asahi Denka Kogyo K.K., epoxy equivalent: 165
*2) "Adecaresin EPES-0425", tradename, manufactured by Asahi Denka Kogyo K.K., epoxy equivalent: 230
*3) "Adecahardner EH-235G", tradename, manufactured by Asahi Denka Kogyo K.K., amine value: 800
*4) "Adecahardner EH-266", tradename, manufactured by Asahi Denka Kogyo K.K., amine value: 350

| Base components | |
|---|---|
| Hydrophobic bisphenol A type liquid epoxy resin *5) | 100 parts |
| Self-emulsifiable liquid epoxy resin *2) | 50 parts |
| Precipitated barium sulfate | 150 parts |
| Titanium oxide | 30 parts |
| Curing agent components | |
| Ketimine compound *3) | 100 patts |
| Modified aromatic polyamine *6) | 200 parts |
| Precipitated barium sulfate | 300 parts |
| Carbon black | 3 parts |

*5) "Adecaresin EP-4520S", tradename, manufactured by Asahi Denka Kogyo K.K., epoxy equivalent: 205
*6) "Adecahardner EH-551", tradename, manufactured by Asahi Denka Kogyo K.K., amine value: 270

| Base components | |
|---|---|
| Hydrophobic bisphenol A type liquid epoxy resin *5) | 100 parts |
| Self-emulsifiable liquid epoxy resin *2) | 25 parts |
| Precipitated barium sulfate | 125 parts |
| Titanium oxide | 30 parts |

-continued

| Curing agent components | |
|---|---|
| Ketimine compound *3) | 100 parts |
| Modified aliphatic polyamine *4) | 100 parts |
| Modified aromatic polyamine *6) | 100 parts |
| Precipitated barium sulfate | 300 parts |
| Carbon black | 3 parts |

| Base components | |
|---|---|
| Hydrophobic bisphenol F type liquid epoxy resin *7) | 100 parts |
| Self-emulsifiable liquid epoxy resin *2) | 100 parts |
| Precipitated barium sulfate | 200 parts |
| Titanium oxide | 50 parts |
| Curing agent components | |
| Ketimine compound *3) | 100 parts |
| Modified aliphatic polyamine *4) | 70 parts |
| Modified aromatic polyamine *6) | 130 parts |
| Precipitated barium sulfate | 300 parts |
| Carbon black | 3 parts |

*7) "Adecaresin EP-4950", tradename, manufactured by Asahi Denka Kogyo K.K., epoxy equivalent; 190

| Base Components | |
|---|---|
| Hydrophobic bisphenol A type liquid epoxy resin *1) | 100 parts |
| Precipitated barium sulfate | 100 parts |
| Titanium oxide | 25 parts |

In the same manner as in Example 1, 100 parts of the base components and 50 parts of the curing agent components were mixed except that the base components were changed as above, to obtain a coating material.

| Base components | |
|---|---|
| Self-emulsifiable liquid epoxy resin *2) | 100 parts |
| Precipitated barium sulfate | 100 parts |
| Titanium oxide | 25 parts |

| Curing agent components | |
|---|---|
| Modified aliphatic polyamine *4) | 100 parts |
| Precipitated barium sulfate | 100 parts |
| Carbon black | 1 parts |

In the same manner as in Example 1, 100 parts of the base components and 50 parts of the curing agent components were mixed except that the curing agent components were changed as above, to obtain a coating material.

Performance tests

A concrete flat plate (300×300×60 mm) was immersed in fresh water for 7 days to have water sufficiently impregnated, and the surface of the concrete flat plate was cleaned with a scrubbing brush. Then, the coating material prepared in each Example or Comparative Example was coated in water (15° C.) on the surface by a rubber knife so that the coated amount would be about 500 g/m$^2$, whereby coating efficiency was as shown in Table 1.

Further, the coated concrete flat plate was aged as it was in water for 14 days to cure the coating film. Then, it was taken out from water and naturally dried at room temperature for 24 hours. With respect to each test specimen, the adhesive strength of the coating film to the concrete flat plate surface was measured, and the results are shown in Table 1.

The adhesion test method was carried out as follows.

In accordance with JIS A-6909, item 5.8, with respect to each test specimen, a cutting line reaching to the concrete flat plate surface was imparted in a size of 40×40 mm, and a steel tensile jig was bonded by an epoxy resin type adhesive to the coating film surface within the cutting line and left to stand for 24 hours.

The tensile jig was pulled in a vertical direction at a loading speed of 175 kgf/min while the test specimen was held in a horizontal direction, to obtain the maximum tensile load, which was represented by the adhesive strength (kgf/cm$^2$).

As is evident from the results shown in Table 1, the coating compositions of Examples 1 to 4 which are the coating compositions of the present invention, were good in the coating efficiency and excellent also in the adhesive strength.

On the other hand, with the coating composition of Comparative Example 1 wherein no self-emulsifiable liquid epoxy resin was incorporated, the coating material did not adhere to the concrete flat plate, and no coating film was formed.

Further, with the coating composition of Comparative Example 2 wherein no hydrophobic liquid epoxy resin was incorporated, a coating film was partially formed, but the coating material dissolved in water, whereby water became turbid.

Further, with the coating composition of Comparative Example 3 wherein no ketimine compound as a curing agent was incorporated, the coating efficiency was poor, and the adhesive strength was also inadequate.

TABLE 1

| Example No. | Coating efficiency in water | Adhesive strength (kgf/cm$^2$) | Peeling state |
|---|---|---|---|
| 1 | Coated without any trouble | 20 | Breakage of the concrete flat plate |
| 2 | Coated without any trouble | 21 | Breakage of the concrete flat plate |
| 3 | Coated without any trouble | 19 | Breakage of the concrete flat plate. |
| 4 | Coated without any trouble | 20 | Breakage of the concrete flat plate |
| Comparative Example No. | | | |
| 1 | The coating material was dispersed in water and could not be coated. | — | — |
| 2 | A coating film was partly formed, but the coating material dissolved in water, whereby water became turbid. | — | — |
| 3 | It was possible to coat the coating material by forcibly rubbing the coating | <5 | Boundary peeling between the coating film and the concrete flat plate |

TABLE 1-continued

| Example No. | Coating efficiency in water | Adhesive strength (kgf/cm$^2$) | Peeling state |
|---|---|---|---|
| | material against the plate from 5 to 6 times, but the coating efficiency was poor. | | |

The underwater curable coating composition of the present invention can be coated on various structures in water or in a wet condition, and thus is an epoch-making coating material which is capable of forming a coating film excellent in the adhesion even against a concrete structure having water impregnated therein.

What is claimed is:

1. An underwater curable coating composition of a non-solvent type which comprises a binder consisting essentially of an epoxy resin component and its curing agent, wherein the epoxy resin component is an epoxy resin mixture comprising a hydrophobic epoxy resin which is liquid at room temperature and a self-emulsifiable epoxy resin which is liquid at room temperature, and the curing agent is composed partly or solely of a ketimine compound.

2. The underwater curable coating composition according to claim 1, wherein the mixing ratio by weight of the hydrophobic epoxy resin to the self-emulsifiable epoxy resin is within a range of from 100:20 to 100:200, and the curing agent is incorporated so that active hydrogen contained in the curing agent is from 0.7 to 1.5 equivalents per equivalent of epoxy groups contained in the epoxy resin mixture.

3. The composition of claim 1, wherein the self-emulsifiable epoxy resin has carboxyl groups, amino groups, hydroxyl groups, carbonyl groups, or —SO$_3$H groups.

4. The composition of claim 1, wherein the self-emulsifiable epoxy resin has carboxyl groups, amino groups, carbonyl groups, or —SO$_3$H groups.

5. A method of coating an object comprising applying the composition of claim 1 to the object, followed by curing the composition.

6. The method of claim 5, wherein the applying and curing steps are conducted in a wet environment.

7. The method of claim 5, wherein the applying and curing steps are conducted in water.

8. The method of claim 5, wherein the object is a steel or concrete structure.

9. The method of claim 8, wherein the object is a steel structure.

10. The method of claim 8, wherein the object is a concrete structure.

* * * * *